(12) United States Patent
Aaron et al.

(10) Patent No.: US 8,290,479 B2
(45) Date of Patent: *Oct. 16, 2012

(54) METHODS, SYSTEMS, AND COMPUTER PROGRAM PRODUCTS FOR SCHEDULE MANAGEMENT BASED ON LOCATIONS OF WIRELESS DEVICES

(75) Inventors: Jeffrey Aaron, Atlanta, GA (US); John Ruckart, Atlanta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/078,687

(22) Filed: Apr. 1, 2011

(65) Prior Publication Data

US 2011/0188351 A1    Aug. 4, 2011

Related U.S. Application Data

(63) Continuation of application No. 11/674,769, filed on Feb. 14, 2007, now Pat. No. 7,941,133.

(51) Int. Cl.
*H04M 3/00* (2006.01)

(52) U.S. Cl. .............. 455/418; 455/456.3; 709/228; 379/201.06

(58) Field of Classification Search .......... 455/418, 455/456.1, 456.2, 456.3, 456.4, 456.5, 414.1; 705/8
See application file for complete search history.

(56) References Cited

U.S. PATENT DOCUMENTS

| | | | |
|---|---|---|---|
| 4,782,521 A | 11/1988 | Bartlett et al. | |
| 5,790,974 A * | 8/1998 | Tognazzini | 455/456.5 |
| 5,938,721 A * | 8/1999 | Dussell et al. | 701/468 |
| 6,263,209 B1 * | 7/2001 | Reed et al. | 455/456.3 |
| 6,484,033 B2 * | 11/2002 | Murray | 455/456.3 |
| 7,084,758 B1 * | 8/2006 | Cole | 340/539.11 |
| 7,139,722 B2 | 11/2006 | Perrella et al. | |
| 2001/0049275 A1 | 12/2001 | Pierry et al. | |
| 2002/0022923 A1 * | 2/2002 | Hirabayashi et al. | 701/200 |
| 2002/0067308 A1 * | 6/2002 | Robertson | 342/357.17 |
| 2002/0194246 A1 * | 12/2002 | Moskowitz et al. | 709/102 |
| 2003/0088534 A1 * | 5/2003 | Kalantar et al. | 706/50 |
| 2003/0204474 A1 * | 10/2003 | Capek et al. | 705/64 |
| 2004/0131014 A1 | 7/2004 | Thompson et al. | |
| 2004/0230685 A1 * | 11/2004 | Seligmann | 709/228 |
| 2005/0060365 A1 * | 3/2005 | Robinson et al. | 709/203 |
| 2005/0221820 A1 * | 10/2005 | Ruetschi | 455/432.3 |
| 2005/0227712 A1 * | 10/2005 | Estevez et al. | 455/456.3 |
| 2005/0283308 A1 * | 12/2005 | Szabo et al. | 701/207 |
| 2006/0068812 A1 * | 3/2006 | Carro et al. | 455/456.3 |
| 2006/0077055 A1 * | 4/2006 | Basir | 340/539.13 |
| 2006/0111089 A1 * | 5/2006 | Winter et al. | 455/414.1 |
| 2006/0218029 A1 * | 9/2006 | Chin | 705/8 |

(Continued)

*Primary Examiner* — Charles Shedrick

(74) *Attorney, Agent, or Firm* — Parks IP Law LLC; Mickki D. Murray, Esq.

(57) ABSTRACT

A method for managing appointments using a wireless device includes receiving scheduling data for a future appointment including a time associated with the future appointment. A current location of the wireless device is determined, and a reminder for the future appointment is provided at a time prior to the future appointment based on the current location of the wireless device. For example, the reminder may be provided at a time that varies based on the current location of the wireless device, a location associated with the future appointment, and an estimated travel time between the current location of the device and the location associated with the future appointment. Related methods, devices, and computer program products are also discussed.

21 Claims, 4 Drawing Sheets

U.S. PATENT DOCUMENTS

| | | |
|---|---|---|
| 2006/0225076 A1* | 10/2006 | Longobardi ................. 718/102 |
| 2006/0265294 A1 | 11/2006 | De Sylva |
| 2007/0071209 A1* | 3/2007 | Horvitz et al. ........... 379/201.06 |
| 2007/0230282 A1* | 10/2007 | May et al. ...................... 368/29 |
| 2008/0032719 A1* | 2/2008 | Rosenberg .................. 455/466 |
| 2008/0079566 A1* | 4/2008 | Singh et al. ............. 340/539.13 |
| 2008/0082651 A1* | 4/2008 | Singh et al. ................. 709/224 |
| 2008/0086455 A1* | 4/2008 | Meisels et al. .................. 707/3 |
| 2008/0114638 A1* | 5/2008 | Colliau et al. ..................... 705/9 |
| 2008/0171559 A1* | 7/2008 | Frank et al. ................ 455/456.5 |
| 2008/0195312 A1* | 8/2008 | Aaron et al. ................... 701/209 |
| 2008/0311929 A1* | 12/2008 | Carro et al. ................ 455/456.3 |
| 2009/0036148 A1* | 2/2009 | Yach ............................ 455/457 |
| 2009/0191895 A1* | 7/2009 | Singh et al. ............... 455/456.1 |
| 2009/0327169 A1* | 12/2009 | Kamar et al. ................... 706/11 |

* cited by examiner

METHODS, SYSTEMS, AND COMPUTER PROGRAM PRODUCTS FOR SCHEDULE MANAGEMENT BASED ON LOCATIONS OF WIRELESS DEVICES

CROSS-REFERENCE TO RELATED APPLICATION

The present application is a continuation of and claims priority to U.S. patent application Ser. No. 11/674,769 filed Feb. 14, 2007 now U.S. Pat. No. 7,941,133, the disclosure of which is incorporated by reference herein in its entirety.

FIELD OF THE INVENTION

The present invention relates to schedule management, and more particularly, to schedule management using wireless devices.

BACKGROUND OF THE INVENTION

Time management is a common and increasing problem in today's society. As commitments increase, keeping track of appointments, tasks, errands, and/or scheduled meetings and their associated times and/or locations may become increasingly difficult. Planning the logistics of trips between scheduled appointments may also be time-consuming.

As such, various wireless electronic devices, such as Personal Digital Assistants (PDAs), and software applications, such as Microsoft Outlook®, have been developed to aid in time management. Such devices and/or applications may allow users to portably access and manage their scheduled tasks and/or appointments. For example, a PDA including a schedule management application may be used to organize future tasks and/or appointments so that they may be taken care of in a timely fashion. More particularly, scheduling data for future appointments may be entered into the schedule management application and stored in a memory of the PDA, and the PDA may provide a reminder for an appointment, such as an audible and/or visible reminder, to the user of the PDA prior to the appointment based on the scheduling data. Although such reminders may be helpful, the reminders may need to be set and/or manually updated by the user of the PDA. In addition, the effectiveness of such reminders may be dependent on the foresight of the user to set the reminder well in advance of a scheduled task. For example, if a task requires three hours to complete, a default reminder that is set 15 minutes prior to the scheduled deadline for the task may be of little help.

SUMMARY OF THE INVENTION

According to some embodiments of the present invention, a method for managing appointments in a wireless device includes receiving scheduling data for a future appointment, and determining a current location of the wireless device. The scheduling data includes a time associated with the future appointment. A reminder for the future appointment is provided at a time prior to the future appointment that varies based on the current location of the wireless device. For example, the reminder may be an audible, visible, and/or tactile alert signal.

In some embodiments, the scheduling data may further include a location associated with the future appointment. The reminder may be provided at the time based on the current location of the wireless device relative to the location associated with the future appointment.

In other embodiments, an estimated travel time between the current location of the device and the location associated with the future appointment may be calculated. The time for the reminder may be determined based on the estimated travel time and the time associated with the future appointment. For example, the estimated travel time may be calculated based on historical data associated with the location of the future appointment and/or real-time travel conditions between the current location of the device and the location of the future appointment. The real-time travel conditions may include traffic and/or weather conditions between the current location and the location associated with the appointment, and/or a speed of travel associated with the wireless device.

In some embodiments, a travel route to the location associated with the future appointment may be selected based on the current location of the wireless device. A map and/or directions to the location associated with the future appointment may be provided based on the selected travel route.

In other embodiments, the current location of the wireless device may be repeatedly determined to detect changes in the current location of the wireless device. The time for the reminder may be dynamically updated based on the changes in the current location of the wireless device.

In some embodiments, task data for a plurality of future tasks to be completed may be received. The task data may include a corresponding plurality of locations associated with the plurality of future tasks. An order of completion for the plurality of future tasks may be automatically determined based on the corresponding plurality of locations and the current location of the wireless device.

In other embodiments, the scheduling data may further include contact information for at least one person associated with the future appointment. In addition, it may be determined that that a user of the wireless device will be late for the future appointment based on the current location of the wireless device, the location of the future appointment, and the time of the future appointment. Responsive to determining that the user will be late, a message may be automatically transmitted to at least one electronic device associated with the at least one person based on the contact information. The message may be an automated message and/or a user-specific message. In some embodiments, a prompt to transmit the message may be automatically displayed responsive to determining that the user will be late, and the message may be transmitted responsive to receiving a user selection.

In some embodiments, location information indicating the current location of the wireless device may be transmitted to a schedule management server prior to the future appointment. The location information may be transmitted periodically, intermittently, and/or based on the time associated with the future appointment.

According to other embodiments of the present invention, a method for managing attendance of a future appointment includes receiving scheduling data for the future appointment including a time and location associated with the future appointment and attendance status information for a plurality of attendees. Location information indicating a current location of a wireless device associated with one of the plurality of attendees is also received. Based on the current location of the wireless device and the time and/or location associated with the future appointment, a likelihood of attendance of the future appointment is predicted for the one of the plurality of attendees. The attendance status information for the one of the plurality of attendees of the future appointment is updated based on the predicted likelihood of attendance.

In some embodiments, a message may be automatically transmitted to an electronic device associated with another one of the plurality of attendees indicating the updated attendance status information for the one of the plurality of attendees. The message may indicate the current location of the wireless device, an estimated delay time, and/or an estimated time of arrival based on the current location of the wireless device and the location associated with the future appointment.

In other embodiments, presence information may be received indicating that the another one of the plurality of attendees is currently using one of a plurality of electronic devices. The message may be adaptively transmitted to the one of the plurality of electronic devices based on the presence information for the another one of the plurality of attendees.

In some embodiments, the electronic device associated with the another one of the plurality of attendees may include a schedule management application that is different from a schedule management application associated with the wireless device. As such, the updated attendance status information may be provided in a format that is compatible with the scheduling management application of the electronic device associated with the another one of the plurality of attendees.

In other embodiments, it may be determined to cancel the future appointment based on the current location of the wireless device and the location associated with the future appointment. A cancellation notification for the future appointment may be transmitted to an electronic device associated with another one of the plurality of attendees responsive to the determination. In some embodiments, additional scheduling data for at least one of the plurality of attendees may be accessed, and a future time to reschedule the future appointment may be determined based on the additional scheduling data for the at least one of the plurality of attendees. The scheduling data for the future appointment may be automatically updated based on the canceling and/or rescheduling.

Other methods, systems, devices, and/or computer program products according to other embodiments of the invention will become apparent to one with skill in the art upon review of the following drawings and detailed description. It is intended that all such additional methods, systems, devices, and/or computer program products be included within this description, be within the scope of the present invention, and be protected by the accompanying claims.

DETAILED DESCRIPTION OF EMBODIMENTS OF THE INVENTION

Figure 1:
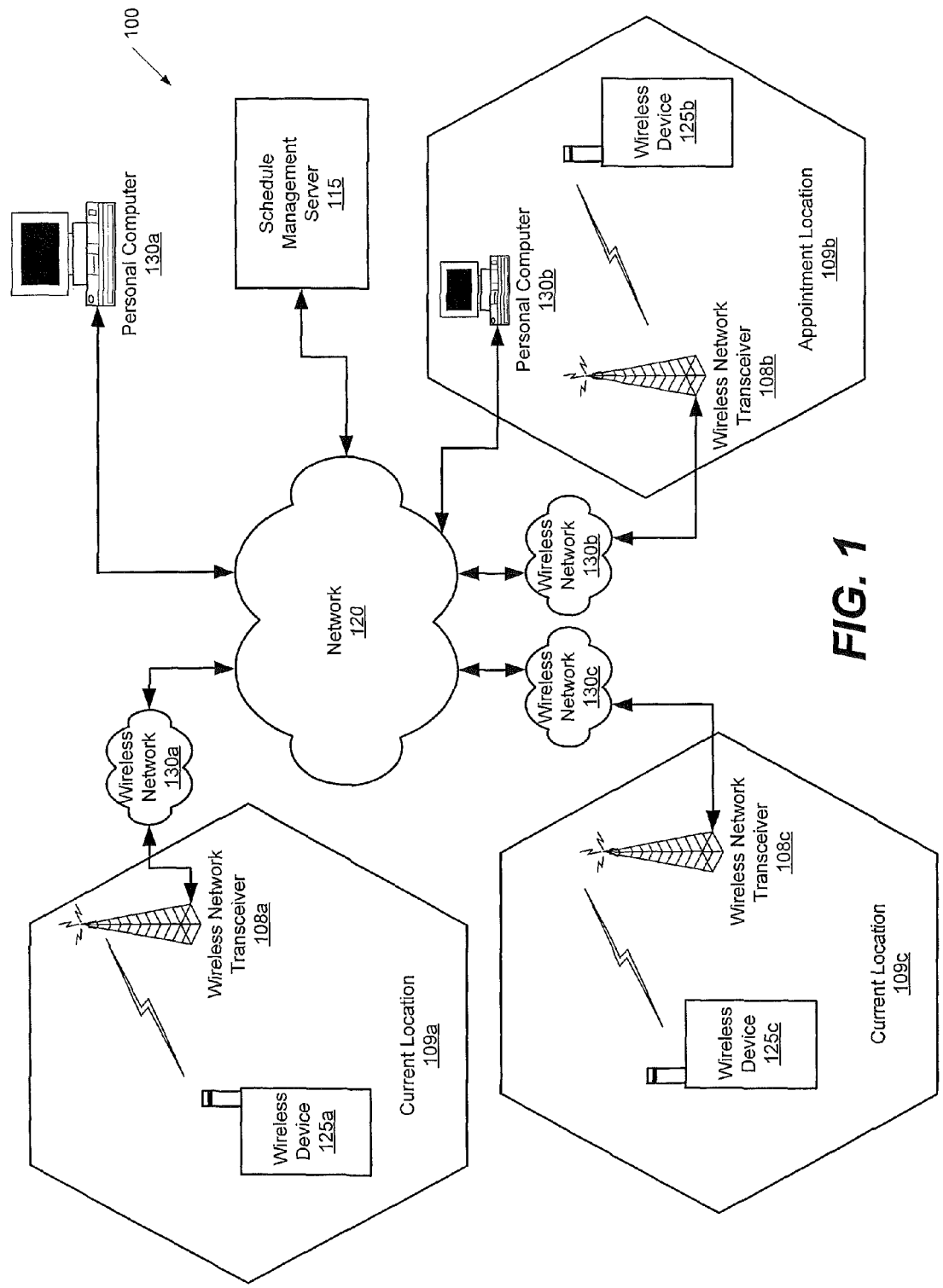
FIG. 1 is a block diagram illustrating a system for managing appointments using wireless devices according to some embodiments of the present invention.

Specific embodiments of the invention will now be described with reference to the accompanying drawings. This invention may, however, be embodied in many different forms and should not be construed as limited to the embodiments set forth therein. Rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first mobile electronic device could be termed a second mobile electronic device, and, similarly, a second mobile electronic device could be termed a first mobile electronic device without departing from the teachings of the disclosure.

The present invention is described hereinafter with reference to flowchart and/or block diagram illustrations of systems, methods; and computer program products in accordance with some embodiments of the invention. These flowchart and/or block diagrams further illustrate operations of the system and device architectures of FIGS. 1 to 6. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Computer program code for carrying out operations of systems, methods, and computer program products according to some embodiments of the present invention discussed below may be written in a high level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and the relevant art, and will not be interpreted in an idealized or overly formal sense unless expressly so defined herein.

As used herein, the term "wireless device" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; a notebook or laptop computer that includes a modem or other network transceiver; and/or other portable device that is capable of receiving and/or storing scheduling data.

Some embodiments of the present invention provide methods, systems, and computer program products that use wireless devices and/or schedule management applications, such as calendar applications, to trigger alerts and communications for future appointments based on the current location of a wireless device. For example, a user may enter scheduling data including times, locations, and/or contact information for future appointments into a schedule management application on a wireless device. Then, throughout the course of the day, the schedule management application may remind the user of an upcoming appointment at a time that varies based on the current location of the wireless device. For example, the interval between the time of the reminder and the time of the appointment may be based on the current location of the wireless device relative to the location of the appointment and/or the estimated travel time between the two locations. In addition, the wireless device may transmit location information indicating its current location to a schedule management server, which may use the current location of the wireless device to predict the likelihood that the user will attend the schedule meeting, and may alert the other attendees accordingly.

By way of background, some embodiments of the present invention may employ location techniques having certain characteristics in common with conventional location techniques. For example, location may be estimated by collecting a requisite number of ranging measurements from signals passed between transmitter(s) and receiver(s), wherein either the transmitter(s) or the receiver(s) have known or determinable locations (i.e., positions). Further, each of the collected ranging measurements can generally be converted from a time interval measurement to a corresponding distance measurement, for example, by multiplying by the speed of light or an expected speed of transmission associated with the signal. When the conversion from time to distance has been accomplished, traditional triangulation, or other like mathematical techniques, can be used to determine the positional coordinates of the mobile device, based on the known locations and calculated distances.

For example, in GPS location techniques, the positions of GPS satellites may vary with regard to time. Thus, a GPS receiver generally needs to receive an accurate measurement of time from the GPS satellites (or an accurate GPS-related source on the ground) in order to know the positions of the GPS satellites at the time of the ranging measurements. The ranging measurements between the GPS receiver and each of at least four (4) GPS satellites may occur by: 1) finding the starting point on the 1023 chip long Gold code sequence within the signal transmitted by each GPS satellite; 2) finding the start time of a bit edge; and 3) finding the start time of the data message. The resulting "time of flight" for the signal received from each GPS satellite is then converted to distance. The resulting four (4) range measurements allow for a solution to the GPS receiver's position in x, y and z coordinates and for determination of the unknown time difference between the GPS time and the GPS receiver's independent clock.

FIG. 1 illustrates a system for location-based schedule management and related devices and methods according to some embodiments of the present invention. Referring now to FIG. 1, a system 100 provides communications for a plurality of wireless devices 125a-125c. For example, one or more of the wireless devices 125a-125c may be a cellular telephone, a personal digital assistants (PDAs), and/or a laptop computer that is configured to receive and/or store scheduling data; however, the wireless devices 125a-125c need not all be identical. Each of the wireless devices 125a-125c may be located in different geographic locations 109a-109c, respectively. The wireless devices 125a-125c may be configured to communicate over a network 120 and/or wireless networks 130a-130b via wireless network transceivers 108a-108c. The system 100 may further include a schedule management server 115, non-mobile terminals, such as personal computers 130a-130b, and/or other network devices coupled to the network 120.

The network 120 may represent a global network, such as the Internet, or other publicly accessible network. The network 120 may also, however, represent a wide area network, a local area network, an Intranet, or other private network, which may not be accessible by the general public. Furthermore, the network 120 may represent a combination of one or more wired and/or wireless public and/or private networks and/or virtual private networks (VPN). The wireless networks 130a-130c may be, for example, cellular networks and/or ad-hoc wireless networks. The networks 120 and/or 130a-130c may utilize multiple wireless and/or wireline access protocols. For example, the wireless access protocols may include GSM GPRS, GSM EDGE, GSM UMTS, CDMA 1xRTT, CDMA EVDO, Wi-Fi, and/or Wi-MAX. The wireline access protocols may include, for example, DSL, cable modem, and/or Ethernet.

Still referring to FIG. 1, one or more of the wireless devices 125a-125c may be configured to provide a reminder for a future appointment at a time prior to a future appointment that varies based on the current locations 109a-109c of the wireless devices 125a-125c. For example, the reminder may be an audible, visible, and/or tactile alert signal provided via the user interfaces of the wireless devices 125a-125c. In addition, the reminder may be a pop-up reminder similar to a Microsoft Outlook® reminder, a web pop-up, and/or other similar message.

The following operations for managing appointments will be described with reference to the wireless device 125a; however, it is to be understood that the wireless devices 125b and/or 125c may be configured to perform similar operations in some embodiments of the present invention. More particularly, as shown in FIG. 1, the wireless device 125a is configured to receive scheduling data for a future appointment, including a time of the appointment and a location 109b associated with the appointment. For example, the wireless device 125a may receive the scheduling data from a user of the wireless device 125a via a user interface. In addition, the wireless device 125a may download the scheduling data from a personal computer 130a associated with the user. For instance, the wireless device 125a may be a PDA including a schedule management application, and may be configured to synchronize information with a schedule management application on the user's personal computer 130a via a wired and/or wireless connection thereto. Also, in some embodiments, the wireless device 125a may be configured to receive scheduling data and/or updates from the schedule management server 115.

In addition, the wireless device 125a is configured to determine its current geographic location 109a, for instance, using location-based services. Location based services (LBS) may refer to location determination and/or location-specific advertising and/or other information services that may be accessible to wireless devices. For example, the wireless device 125a may include a built-in Global Positioning system (GPS) chip, and may thereby determine its current location 109a using the GPS location techniques described above. In addition and/or alternatively, the wireless device 125a may be configured to receive information indicating its current location 109a from the network 120. For instance, the network service provider may determine the location of the wireless device 125a using radiolocation and/or trilateration techniques based on the strength of a wireless signal received at the wireless network transceiver 108a, and may relay this information to the wireless device 125a via the network 120. Although the locations 109a-109c are illustrated in FIG. 1 with reference to particular cells and/or wireless network transceivers 108a-108c, other location techniques may also be used to determine the current location 109a of the wireless device 125a. Such location techniques are well-known in the art and need not be discussed further herein.

Based on the received scheduling data for the future appointment and the determination of its current location 109a, the wireless device 125a is configured to provide a reminder for the future appointment at a particular time prior to the appointment. For example, the wireless device 125a may be configured to provide the reminder at a time that varies based on the current location 109a of the wireless device 125a relative to the location 109b associated with the appointment. The time of the reminder may be determined so that the user of the wireless device 125a may have sufficient time to travel from the current location 109a to the location 109b in time for the appointment. More particularly, the wireless device 125a may be configured to calculate an estimated travel time between the current location 109a of the wireless device 125a and the location of the future appointment 109b, and may determine the time for the reminder based on the estimated travel time and the time of the future appointment. For example, the wireless device 125a may access map, weather, and/or traffic data via the network 120, and may thereby determine real-time travel conditions that may affect the travel time between the current location 109a of the wireless device and the appointment location 109b. The wireless device 125a may also predict and/or select a particular travel route between the current location 109a of the wireless device and the appointment location 109b based on the real-time traffic conditions, and may calculate the estimated travel time (and thus, the time of the reminder) based on the selected route. Route prediction and/or selection may use calculations of shortest distance and/or quickest travel time in conjunction with appropriate rules and/or logic, and may be configured to adapt to current conditions via rule selection and/or modification or adjustment of parameters. As such, based on its current location, the wireless device 125a is configured to provide a reminder for a future appointment at a time that is sufficiently prior to the time of the appointment to allow the user to arrive at the appointment location 109b on-time. The wireless device 125a may also be configured to provide a map and/or directions to the appointment location 109b based on the current location 109a of the wireless device 125a and the selected travel route. The map and/or directions may be downloaded, for example, from the network 120.

In addition, the wireless device 125a may be configured to provide the reminder at a time based on historical data associated with the appointment location 109b and/or nearby locations, for example, using geographic information system techniques. A geographic information system (GIS) may refer to a system for capturing, storing, analyzing and managing data and associated attributes which are spatially referenced to the earth and/or various types of maps and map-associated data. For example, the wireless device 125a may be configured to store historical data including previous travel times, travel routes, travel speeds, traffic conditions, and/or other problems associated with travel between the current location 109a of the wireless device 125a and locations within a vicinity of the appointment location 109b. Also, the wireless device 125a may be configured to download such historical data for the current location 109a and/or the appointment location 109b from a GIS database (not shown) via the network 120. The historical data may be used to estimate the time needed to travel from the current location 109a to the location 109b associated with the appointment. As such, the wireless device 125a may determine the time for the reminder and provide the reminder at a sufficient time prior to the appointment based on the historical data.

Furthermore, the wireless device 125a may be configured to dynamically update the time for the reminder based on the changes in its current location. For example, after determining that the reminder should be provided at a particular time based on the location 109a of the wireless device 125a and the location 109b of the future appointment, the user of the wireless device 125a may carry the device to another location 109c. The wireless device 125a may be configured to detect this change in location using one or more of the location techniques described above, and may thereby dynamically re-determine the time for the reminder based on the change in location, for example, using rules, algorithms, and/or other techniques. For example, as shown in FIG. 1, the location 109c may be geographically closer to the appointment location 109b than the location 109a. As such, the wireless device 125a may dynamically update the time of the reminder to a time that is closer to the time of the future appointment, based on its new location 109c being closer to the appointment location 109b. The wireless device 125a may be configured to detect changes in its location by repeatedly determining its current location periodically, intermittently, and/or at predetermined times based on the time of the appointment. Thus, the wireless device 125a may provide the reminder at the updated time prior to the time of the appointment based on the change in its current location.

Also, in some embodiments, the wireless device 125a may be configured to predict that the user will be late for the appointment based on the current time, the current location 109a of the wireless device, and the time and location 109b of the appointment. More particularly, based on the time of the appointment and the calculated travel time between the current location 109a and the appointment location 109b, the wireless device 125a may determine that the user cannot arrive at the appointment location 109b in time for the appointment. In such an event, the wireless device 125a may automatically transmit a message to an electronic device associated with a contact person for the appointment, such as the wireless device 125b, to inform the contact person that the user will be late. The message may be transmitted to the wireless device 125b based on contact information included in the scheduling data. More particularly, responsive to determining that the user will be late, the wireless device 125a may automatically display a prompt to initiate a phone call, e-mail, Short Messaging System (SMS) message, Instant Message (IM), and/or other message to the contact person's wireless device 125b to thereby inform the contact person of the user's delay. The message may be generic, automated message and/or a user-specific message. The message may further indicate the current location 109a of the wireless device 125a, an estimated delay time, and/or an estimated time of arrival at the appointment location 109b, for example, based on the estimated travel time calculated by the wireless device 125a.

Moreover, the wireless device 125a may be configured to receive presence information indicating that the contact person is currently using one of a number of electronic devices associated with the contact person. For example, if the contact person is logged on to the schedule management server 115 using a personal computer 130b, the server 115 may transmit presence information to the wireless device 125a over the network 120 indicating that the personal computer 130b associated with the contact person is currently in-use. As such, the wireless device 125a may automatically transmit the message indicating that the user will be late to the personal computer 130b, rather than to the wireless device 125b, based on the presence information received from the schedule management server 115.

In addition to managing appointments, the wireless device 125a may also be configured to manage tasks for the user. As used herein, "appointments" may refer to meetings and/or other activities associated with scheduled times and involving the user of the wireless device 125a and at least one other party, while "tasks" may refer to errands and/or other duties that the user of the wireless device 125a may wish to complete, often (but not necessarily) unilaterally. For example, the wireless device 125a may be configured to receive task data from the user for future tasks that may require completion. The task data may include corresponding geographic locations for the tasks and/or times before which the tasks must be completed. For instance, on a particular day, the user may wish to pick-up clothes from the dry cleaner, stop at a grocery store before dinner, and rent a movie. In addition, the user may have a meeting scheduled at a particular time. As such, based on the task locations, the current location of the wireless device 125a, and/or the time and location associated with the meeting, the wireless device 125a may automatically determine an order of completion for the tasks, for example, using predetermined rules and/or algorithms. More particularly, the wireless device 125a may access map and/or traffic data for the task locations via the network 120, and may determine the order of completion for the tasks based on the proximities between the various locations and its current location 109a. For instance, from the map data, the wireless device 125a may determine that the grocery store and the dry cleaner are located on the same side of the street, and that the user will pass the dry cleaner to get to the grocery store from the location 109a. As such, the wireless device 125a may determine that the dry cleaning should be picked-up prior to stopping at the grocery store. The wireless device 125a may also be configured to take into account that the groceries from the grocery store may be perishable, which may influence the order of completion for that task.

Still referring to FIG. 1, in some embodiments of the present invention, the system 100 is also configured to manage appointments for multiple attendees via the schedule management server 115. More particularly, the schedule management server 115 may be configured to receive scheduling data for a future appointment from schedule management applications executing on one or more of the wireless devices 125a-125b, the personal computers 130a-130b, and/or other devices via the network 120. The scheduling data may include a time and location associated with the future appointment, as well as attendance status information for one or more desired attendees. For example, the users of the wireless devices 125a-125c may wish to schedule a meeting at location 109b at a particular time. Accordingly, after receiving scheduling data indicating the time, location, and desired attendees for the meeting from a user, the wireless device 125a may transmit the received scheduling data to the schedule management server 115. The server 115 may thereby schedule the meeting by transmitting meeting invitations to the wireless devices 125b and 125c associated with the desired attendees, and receiving replies from the wireless devices 125b and 125c indicating whether the users of the wireless devices 125b and 125c will or will not attend. As such, the server 115 may determine initial attendance status information for the attendees associated with the wireless devices 125a-125c. However, it is to be understood that the scheduling data and/or attendance status information may also be received from other devices associated with the attendees, such as the personal computers 130a-130b.

The schedule management server 115 may also receive location information via the network 120 indicating the current locations 109a-109c of one or more of the wireless devices 125a-125c associated with the attendees. More particularly, the schedule management server 115 may receive the location information from one or more of the wireless devices 125a-125c over the network 120, for example, as determined from GPS chips built-in to the wireless devices 125a-125c. In addition and/or alternatively, the location information may be received from the network 120, for example, using radiolocation and/or trilateration techniques based on the signal strength received at the closest ones of the wireless network transceivers 108a-108c. The schedule management server 115 may be configured to receive the location information periodically, intermittently, and/or at times based on the time of the scheduled appointment. The location information may be stored locally at the schedule management server 115 and/or may be stored at one or more other network devices connected to the schedule management server 115 via the network 120.

Based on the time and location 109b associated with the scheduled meeting and the current locations 109a-109c of the wireless devices 125a-125c, the schedule management server 115 may predict the future availability of one or more of the attendees to attend the scheduled meeting. In other words, the schedule management server 115 may determine a likelihood of attendance and/or on-time attendance for one or more of the attendees based on the current locations 109a-109c of the wireless devices 125a-125c. As used herein, the term "likelihood of attendance" may refer to the likelihood that an attendee will arrive at a meeting on-time and/or within a few minutes (or other reasonable delay) of the scheduled time of the meeting. For example, based on the location 109a of the wireless device 125a, the schedule management server 115 may calculate that it will take the user of the wireless device 30 minutes to arrive at the location of the meeting 109b. As such, if the meeting is scheduled to begin in 10 minutes at the location 109b, the schedule management server 115 may determine that the user of the wireless device 125a is unlikely to attend the meeting and/or is unlikely to arrive on-time. In addition, the schedule management server 115 may be configured to predict the likelihood of attendance based on historical data associated with the location 109b and/or based on real-time travel conditions and/or historical routes taken and/or expected routes between the current locations 109a-109c of the wireless devices 125a-125c and the meeting location 109c, for example, by accessing map, weather, traffic, and/or GIS data via the network 120.

The schedule management server 115 may thereby update the attendance status information for one or more of the attendees of the meeting based on the predicted likelihood of attendance. For example, where the schedule management server 115 determines that the user of the wireless device 125a is unlikely to attend the meeting and/or is unlikely to be on-time as discussed above, the server 115 may transmit a message to the wireless devices 125b and 125c indicating that the user of the wireless device 125a will be unable to attend the meeting at the scheduled time. The message may further indicate the current location 109a of the wireless device 125a, an estimated delay time, and/or an estimated time of arrival at the meeting location 109b. In addition, as mentioned above, the server 115 may receive presence information indicating that an attendee is and/or is not currently using one or more electronic devices, and may thereby adaptively transmit the message to a particular device based on the presence information. For example, the schedule management server 115 may determine that a schedule management application is not currently active on a personal computer 130b associated with an attendee (based on a connection thereto via the network 120), and as such, may automatically transmit the message to the wireless device 125b associated with the attendee.

In addition, the schedule management server 115 may be configured to update attendance status information between different schedule management applications. For example, the wireless device 125a may use a particular schedule management application, such as Microsoft Outlook, while the wireless device 125b may use a different schedule management application, such as Apple's iCal. As such, the schedule management server 115 may be configured to provide the updated attendance status information in a format that is recognizable by the particular schedule management application. Thus, the server 115 may be used to provide interoperability between different and/or incompatible schedule management applications.

Moreover, the schedule management server 115 may determine to cancel and/or reschedule the future appointment based on the current locations 109a-109c of the wireless devices 125a-125c and the location of the appointment 109b. For example, if the schedule management server 115 determines that a particularly important attendee (such as a scheduled speaker) and/or a predetermined number of attendees will be unable to arrive at the location 109b in time for the scheduled meeting (based on the current locations of one or more of their wireless devices 125a-125c), the server 115 may determine to cancel the meeting. Alternately or additionally, other criteria may be used, for instance via determining that one or more and/or an important subset of attendees will be late to a degree that exceeds one or more thresholds. As such, the server 115 may transmit a cancellation notification to the wireless devices 125a-125c indicating that the meeting has been canceled. In addition, the schedule management server 115 may be configured to access other scheduling data for the attendees, and may thereby determine a future time to reschedule the meeting. For example, the schedule management server may receive the other scheduling data from one or more of the wireless devices 125a-125c, personal computers 130a-130b, and/or other devices associated with the desired attendees of the canceled meeting. As such, the schedule management server may determine a future time and/or location for the meeting that may be more likely to be acceptable to the desired attendees. The schedule management server 115 may thus transmit a new meeting invitation suggesting the possible meeting time and/or location to the wireless devices 125a-125c, and may receive replies from one or more of the wireless devices 125a-125c indicating that the suggested time and/or location is acceptable. In addition, the server 115 may automatically (i.e., without human intervention) update the scheduling data for the meeting to reflect the new time and/or location. The server 115 may also transmit a notification of the new time and/or location for the meeting to the wireless devices 125a-125c to automatically update the information stored in the wireless devices 125a-125c and/or synchronize information therebetween.

Although FIG. 1 illustrates exemplary systems for location-based schedule management using wireless devices according to some embodiments of the present invention, it will be understood that the present invention is not limited to such configurations, but is intended to encompass any configuration capable of carrying out the operations described herein. For example, although described in the preceding example with reference to schedule management applications executing on the wireless devices 125a-125c, it is to be understood that in some embodiments of the present invention, some or all of the functionality described above with reference to the wireless device 125*a* may be implemented in a server, such as the server 115. For example, the schedule management server 115 may be configured to determine a time for a reminder based on received scheduling data and the current location of the wireless device 125*a*, and may provide the reminder by transmitting a signal to the wireless device 125*a* at the determined time prior to the future appointment. Likewise, some or all of the functionality described above with reference to the schedule management server 115, such as predicting a likelihood of attendance based on the current location of a wireless device and updating the attendance status information, may be implemented in one or more of the wireless devices 125*a*-125*c*. More particularly, each of the wireless devices 125*a*-125*c* may be configured to predict the likelihood of attendance of their users based on their respective locations, and may transmit messages to each other to update their attendance status information. Accordingly, it is to be understood that the functionality of the system 100 illustrated in FIG. 1 may be implemented by one or more of the wireless devices 125*a*-125*c*, the schedule management server 115, the network 120, and/or combinations thereof. In other words, although described above with reference to particular devices having particular functionalities, the functionalities of the particular devices of the system 100 of FIG. 1 may depend on the configuration of the system for location-based schedule management using wireless devices according to some embodiments of the present invention. In addition, some embodiments of the present invention may be implemented using techniques as described in commonly assigned U.S. Pat. No. 7,139,722 filed Jun. 7, 2001, the disclosure of which is incorporated by reference herein in its entirety.

Figure 2:
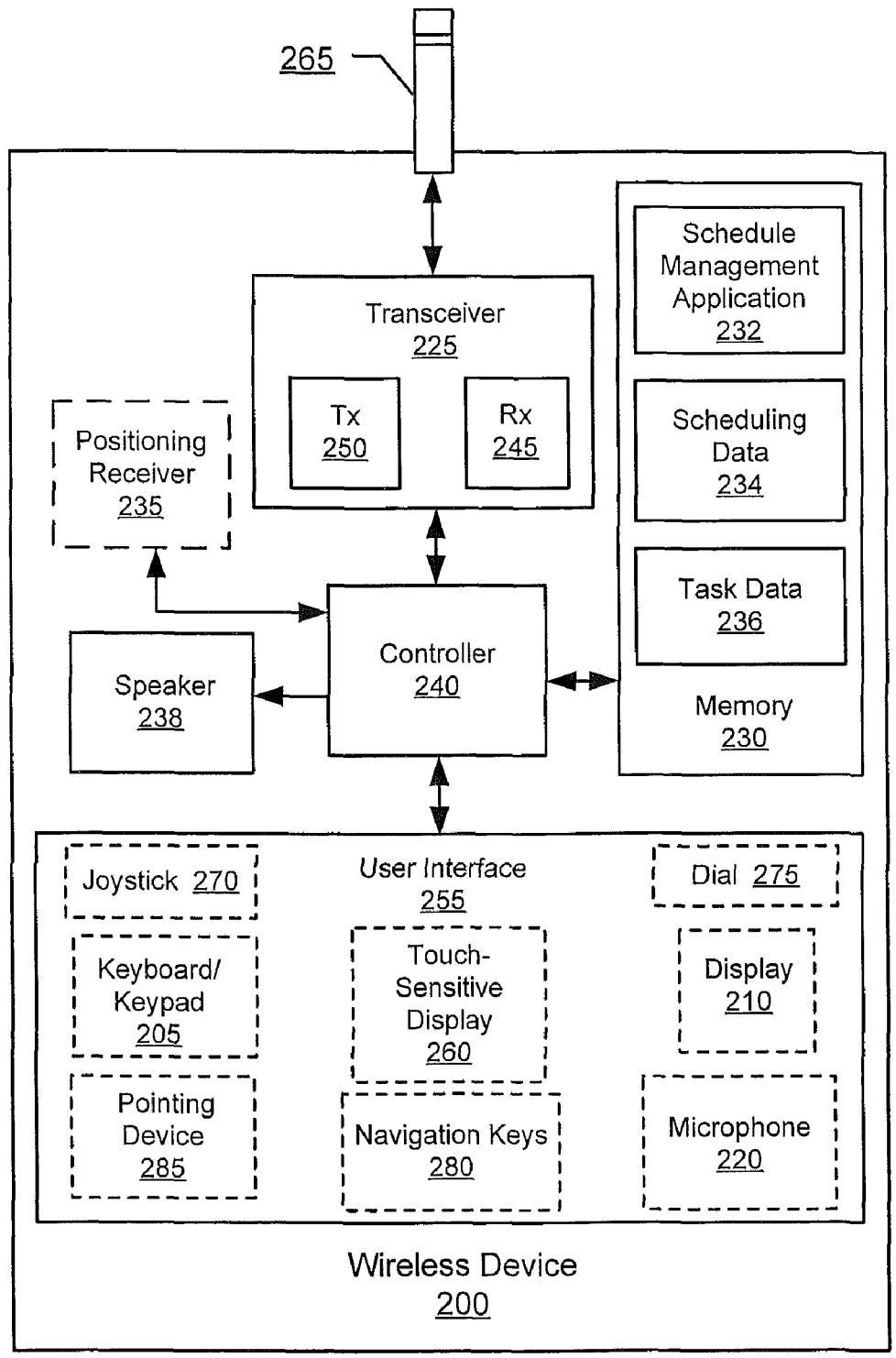
FIG. 2 is a block diagram illustrating a wireless device for managing appointments according to some embodiments of the present invention.

FIG. 2 is a block diagram illustrating a wireless device 200 and related methods of operation according to some embodiments of the present invention. In some embodiments, the wireless device 200 may correspond to one of the wireless devices 125*a*-125*c* of FIG. 1. As shown in FIG. 2, the wireless device 200 includes a transceiver 225, an antenna 265, a controller 240, a memory 230, a speaker 238 and a user interface 255. Depending on the functionalities offered by the wireless device 200, the user interface 255 may include a microphone 220, a display 210 (such as a liquid crystal display), a joystick 270, a keypad 205, a touch sensitive display 260, a dial 275, navigation/directional keys 280, and/or a pointing device 285 (such as a mouse, track ball, touch pad, etc.). However, additional and/or fewer elements of the user interface 255 may actually be provided. For example, the touch sensitive display 260 may be provided in a personal digital assistant (PDA) that does not include a display 210, a keypad 205, and/or a pointing device 285.

The transceiver 225 may include a transmitter circuit 250 and a receiver circuit 245, which respectively transmit outgoing radio frequency signals and receive incoming radio frequency signals via the antenna 265. The radio frequency signals may include both traffic and control signals (e.g., paging signals/messages for incoming calls), which may be used to establish and maintain communication with another party or destination. For example, the transceiver 225 may include a public land mobile network (PLMN) transceiver and/or a wireless local area network (WLAN) transceiver that may be used to transmit and/or receive voice and/or data over a wireless connection to a server and/or other electronic device. The wireless connection may be a packet-switched connection, such as that provided by the Enhanced Data GSM Environment (EDGE) standard, the General Packet Radio Service (GPRS) standard, and/or the Universal Mobile Telecommunications System (UMTS) standard, or a circuit-switched connection. In addition, the wireless connection may be established according to a wireless local-area networking standard, such as Bluetooth, Wi-Fi, and/or Wi-MAX, using the WLAN transceiver. Network security for the wireless local-area network (such as encryption and/or authentication) may be provided according to the applicable network standard being used. While a single antenna 265 is illustrated in FIG. 2 by way of example, separate antennas may be provided for the PLMN transceiver and/or the WLAN transceiver. Alternatively, multiple antennas may be shared by the PLMN transceiver and WLAN transceiver, and/or multiple antennas may be provided for one or both of the PLMN transceiver and WLAN transceiver.

The controller 240 is coupled to the transceiver 225, the memory 230, the speaker 238, and the user interface 255. The controller 240 may be, for example, a commercially available or custom microprocessor configured to coordinate and manage operations of the transceiver 225, the memory 230, the speaker 238, and/or the user interface 255. The memory 230 may represent a hierarchy of memory that may include volatile and/or nonvolatile memory, such as removable flash, magnetic, and/or optical rewritable nonvolatile memory. The foregoing components of the wireless device 200 are well-known in the art and need not be described further herein.

As shown in FIG. 2, the memory 230 is configured to store a schedule management application 232 and scheduling data 234 stored therein. The scheduling data 234 may include a listing of future appointments associated with a user of the wireless device 200, as well as times and/or locations associated with the appointments. The scheduling data 234 may further include contact information for persons associated with the appointments, including phone numbers, e-mail addresses, and or device identifiers for one or more electronic devices associated with each contact person. The scheduling data 234 may be received directly from the user of the wireless device 200 via the user interface 255, and/or may be received from one or more other electronic devices via the transceiver 225. In addition, the scheduling data 234 may be received via a wired connection to an electronic device, such as a stationary personal computer associated with the user of the wireless device 200. The schedule management application 232 may be an application program including calendar functionality for organizing and/or managing the scheduling data 234. As such, using the schedule management application 232, the controller 240 may be configured to organize and/or manage the scheduling data 234 stored in the memory 230 for the benefit of the user.

The wireless device 200 may also include a location determination/positioning receiver 235. The location determination/positioning receiver 235, in cooperation with the controller 240, may provide a processing circuit configured to process ranging signals, for example, as received from GPS satellites. As such, the controller 240 may be configured to determine the current geographic location of the wireless device 200 based on the GPS communication signals received via the positioning receiver 235. However, in some embodiments, the controller 240 may be configured to receive information indicating the current location of the wireless device 200 from a network service provider via the transceiver 225, for example, based on well-known radiolocation and/or trilateration techniques.

Accordingly, based on the scheduling data 234 and the current location of the wireless device 200, the controller 240 is configured to provide a reminder for a future appointment at a particular time prior to the future appointment. The time for the reminder may vary based on the current location of the wireless device 200. For example, the controller 240 may be configured to determine the time for the reminder based on the distance between the current location of the wireless device 200 and the appointment location. As such, the controller 240 may be configured to provide an audible, visible, and/or tangible alert signal via the user interface 255 at the determined time, so that the user of the wireless device 200 may have sufficient time to travel from the current location to the appointment location in time for the appointment.

More particularly, the controller 240 may be configured to calculate an estimated travel time between the current location of the wireless device 200 and the location associated with the appointment, and may determine the time for the reminder based on the estimated travel time and the time of the appointment. The controller 240 may be configured to estimate the travel time based on historical data (including historical routes taken) and/or real-time travel conditions (including an expected route to be taken) between the current location of the wireless device 200 and the appointment location. For example, using the transceiver 225, the controller 240 may be configured to access a GIS database containing historical data associated with the appointment location and/or nearby locations, including prior travel times, travel speeds, traffic conditions, and/or other problems associated with travel between the current location and the appointment location. Likewise, the controller 240 may be configured to access real-time map, weather, and/or traffic data via the transceiver 225, and may thereby determine real-time travel conditions that may affect the travel time between the current location of the wireless device 200 and the appointment location. The controller 240 may be configured to predict and/or select a particular route between the current location of the wireless device 200 and the appointment location based on the real-time traffic conditions, and may also be configured to determine a current and/or estimated speed of travel for the wireless device 200, for example, based on the ranging signals received via the positioning receiver 235. The selected route and the estimated speed of travel may also be used to calculate the estimated travel time. As such, based on the estimated travel time, the controller 240 may be configured to provide the reminder for the future appointment at a time that will allow the user to arrive at the appointment location on-time. In addition, the controller 240 may be configured to download a map and/or directions to the appointment location via the transceiver 225.

The controller 240 may be further configured to dynamically update the time for the reminder based on changes in the current location of the wireless device 200. For example, the controller 240 may be configured to detect changes in the location of the wireless device 200 based on the GPS communication signals received via the positioning receiver 235, and dynamically re-calculate the time needed to travel to the appointment location based on the changes in the current location. The controller 240 may be configured to detect changes in its location by repeatedly determining its current location periodically, intermittently, and/or at predetermined times based on the time of the appointment. For example, the controller 240 may be configured to determine the initial time for the reminder based on the current location of the wireless device 200 several hours prior to a future appointment, and may re-determine the time for the reminder with increasing frequency up to the time of the appointment. Thus, the controller 240 may be configured to update a previously determined time for the reminder based on changes in the location of the wireless device 200.

Also, in some embodiments, the controller 240 may be configured to predict that the user of the wireless device 200 will be late and/or unable to keep the appointment based on the current time, the current location of the wireless device 200, and the time and location of the appointment. For example, based on the estimated travel time between the current location of the wireless device 200 and the appointment location, the controller 240 may determine that the user cannot arrive at the appointment location in time for the appointment and/or within a pre-set or calculated threshold of lateness. In such an event, the controller 240 may be configured to automatically transmit a message to an electronic device associated with a contact person for the appointment and/or a time management/scheduling server or application via the transceiver 225, for example, based on the contact information included in the scheduling data 234. More particularly, responsive to determining that the user will be late, the controller 240 may be configured to automatically display a prompt via the user interface 255 to initiate a phone call, e-mail, Short Messaging System (SMS) message, Instant Message (IM), and/or other message that may inform the contact person that the user will be late. The message may further indicate the current location of the wireless device 200, an estimated delay time, and/or an estimated time of arrival at the appointment location, for example, based on the estimated travel time calculated by the controller 240. The controller 240 may be configured to transmit the message via the transceiver 225 responsive to receiving a user command via the user interface 255.

Moreover, the controller 240 may be configured to adaptively transmit the message to one of a number of electronic devices associated with the appointment contact person based on presence information received via the transceiver 225. For example, the controller 240 may be configured to receive presence information from a server, such as the schedule management server 115 of FIG. 1, indicating that the contact person is currently using a particular electronic device, and may automatically transmit the message to the particular electronic device via the transceiver 225 based on the received presence information. In some embodiments, the controller 240 may be further configured to intermittently and/or periodically transmit location information indicating its current location to the schedule management server 115 via the transceiver 225 for use in managing appointments with users of other wireless devices, as discussed above with reference to FIG. 1. For example, the controller 240 may be configured to transmit the location information at predetermined times based on the time of an appointment and/or responsive to a user command.

In addition to managing appointments, the wireless device 200 may also be configured to manage tasks for the user. As used herein, "appointments" may refer to meetings and/or other activities associated with scheduled times and involving the user of the wireless device 200 and at least one other party, while "tasks" may refer to errands and/or other duties that the user of the wireless device 200 may wish to complete. For example, the wireless device 200 may be configured to receive a list of tasks to be completed from the user via the user interface 255, and may store the tasks in the memory 230 as task data 236. The task data 236 may include a geographic location associated with each task and/or a time before which each task must be completed. Based on the task data 236 and the current location of the wireless device 200, the controller 240 may be configured to automatically determine an order of completion for the tasks. For instance, the controller 240 may access map and/or traffic data via the transceiver 225 to determine the order of completion for the tasks based on the proximities between the various locations included in the task data 236 and the current location of the wireless device 200. The controller 240 may also be configured to consider other factors, such as real-time travel conditions, historical data associated with each task location, and/or factors associated with the particular tasks, such as food perishability, in determining the order of completion. Information relating to these additional factors may be stored in the memory 230 of the wireless device 200 itself and/or may be accessible from other network devices via the transceiver 225.

Although FIG. 2 illustrates an exemplary wireless device 200 that may be used to manage appointments according to some embodiments of the present invention, it will be understood that the present invention is not limited to such configuration, but is intended to encompass any configuration capable of carrying out the functionality described herein. For example, although illustrated in FIG. 2 as a wireless device 200, some of the functionality described herein may be implemented in a stationary and/or other electronic device. For instance, a stationary server may be configured to receive scheduling data for a user of the wireless device 200 and determine a current location of the wireless device 200 via a network, and may provide a reminder for a future appointment by transmitting a signal to the wireless device 200 at a time prior to a future appointment. In addition, some of the functionality described herein may be implemented in a wireless device that may not include a wireless network transceiver. For example, a PDA that includes a GPS receiver may receive scheduling data from a user, determine its current location, and provide a reminder at a time prior to a future appointment based on the current location of the PDA without the use of a wireless network transceiver. Alternatively, the PDA may determine the time for the reminder by accessing GPS, map, and/or traffic data provided by an in-car navigation system, for example, via a Bluetooth connection. More generally, while particular functionalities are shown in particular blocks by way of illustration, functionalities of different blocks and/or portions thereof may be combined, divided and/or eliminated.

Figure 3:
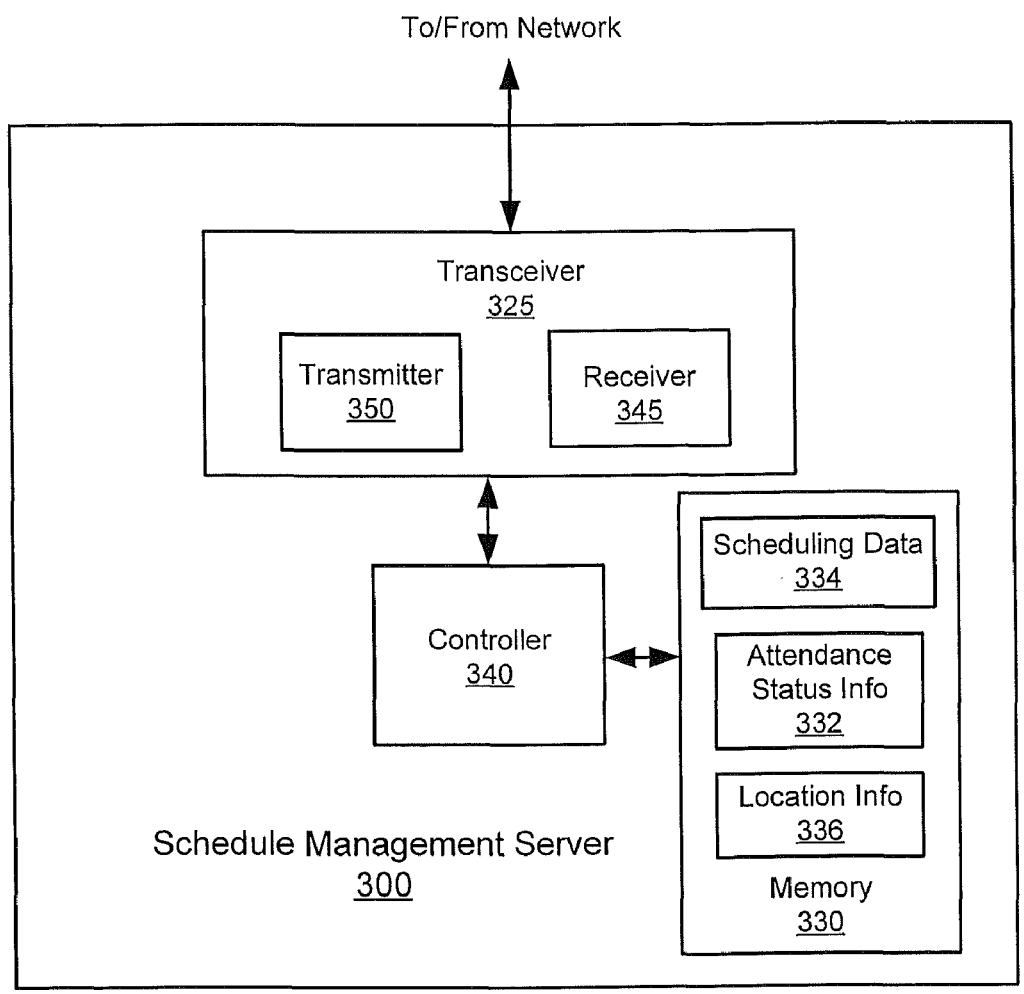
FIG. 3 is a block diagram illustrating a server for managing appointments according to some embodiments of the present invention.

FIG. 3 is a block diagram illustrating a schedule management server 300 and related methods of operation according to some embodiments of the present invention. In some embodiments, the schedule management server 300 may correspond to the schedule management server 115 of FIG. 1. As shown in FIG. 3, the schedule management server 300 includes a transceiver 325 coupled to an antenna 365, a controller 340, and a memory 330. The transceiver 325 includes a transmitter 350 and a receiver 345 configured to establish and maintain communications with one or more other electronic devices via a network, such as the network 120 of FIG. 1.

Still referring to FIG. 3, the controller 340 is coupled to the transceiver 325 and the memory 330. The controller 340 may be, for example, a commercially available or custom microprocessor that is configured to coordinate and manage operations of the transceiver 325 and/or the memory 330. As such, the controller 340 is configured to receive scheduling information for a future meeting and/or other appointment from one or more electronic devices, such as the wireless devices 125a-125c and/or the personal computers 130a-130b of FIG. 1, and may store the received information for the meeting in the memory 330 as scheduling data 334. The scheduling data 334 may include a time and location associated with the future meeting, as well as a list of desired attendees for the meeting. In addition, the controller 340 may be configured to receive information regarding the attendees who are scheduled to attend the meeting, and may store the information in the memory 330 as attendance status information 332. The attendance status information 332 may include indications as to whether each of the attendees is currently scheduled to attend the future meeting. For example, based on the scheduling data 334, the controller 340 may transmit a meeting invitation to one or more electronic devices and/or other scheduling server or application associated with the desired attendees via the transceiver 325, and may receive the attendance status information 332 from the one or more electronic devices and/or other scheduling server or application responsive to transmitting the meeting invitation.

The controller 340 is also configured to receive location information 336 indicating a current location of one or more wireless devices associated with one or more of the attendees, such as the wireless devices 125a-125c of FIG. 1. The controller 340 may receive the location information 336 via the transceiver 325 from the wireless devices themselves (for example, as determined from GPS chips built-in to the wireless devices) and/or from the network (for example, as determined using radiolocation and/or trilateration techniques). The controller 340 may be configured to receive the location information 336 from the wireless devices and/or the network periodically, intermittently, and/or at times based on the time of the scheduled meeting, and may store the location information in the memory 330. For example, in some embodiments, the controller 340 may be configured to transmit a request for the location information 336 to one or more of the wireless devices at predetermined times via the transceiver 325.

Accordingly, based on the time and location associated with the meeting and the current locations of the wireless devices associated with the attendees of the meeting, the controller 340 is configured to determine the likelihood of attendance of one or more of the attendees. In other words, the controller 340 may be configured to predict the future availability of one or more of the attendees to attend the scheduled meeting based on the current locations of their corresponding wireless devices. For example, based on the time and location of the meeting, the controller 340 may be configured to calculate an estimated travel time and/or estimated time of arrival for each of the wireless devices based on their current locations. As such, if the meeting is scheduled to begin in 10 minutes and if two of the wireless devices are determined to be more than 30 minutes away from the geographic location of the meeting, the controller 340 may determine that the attendees associated with those wireless devices are unlikely to attend the meeting at the scheduled time and/or are unlikely to arrive at the meeting location within a few minutes of the scheduled time or other acceptable window for late arrival. The controller 340 may also be configured to predict the likelihood of attendance and/or degree of lateness for one or more of the attendees based on historical data associated with the meeting location and/or based on real-time travel conditions and/or historical routes taken and/or expected routes between the current locations of the wireless devices and the meeting location, for example, by accessing map, weather, traffic, and/or GIS data via the transceiver 325.

The controller 340 is further configured to update the attendance status information 332 for one or more of the attendees of the meeting based on the predicted likelihood of attendance for one or more of the attendees. For example, upon determining that a particular attendee is unlikely to attend and/or arrive promptly at the scheduled meeting based on the current location of his wireless device, the controller 340 may be configured to transmit a message to one or more electronic devices associated with other attendees indicating the attendance status for the particular attendee as 'not available to attend' or 'will not attend on-time'. The message may further indicate the current location of the wireless device associated with the particular attendee, and/or an estimated delay time and/or an estimated time of arrival at the meeting location. In addition, the controller 340 may be configured to receive presence information indicating that an attendee is and/or is not currently using a particular electronic device via the transceiver 325, and may thereby adaptively transmit the message to a particular device based on the presence information. For example, the controller 340 may determine that an associated schedule management application is not currently active on a personal computer associated with an attendee, and as such, may automatically transmit the message to a wireless device associated with the attendee.

In addition, the controller 340 may be configured to provide the attendance status information 332 in a variety of formats, for example, so that the attendance status information 332 may be updated in different schedule management applications. For example, where one or more of the wireless devices associated with the attendees use different schedule management applications (for instance, Microsoft Outlook and Apple's iCal), the controller 340 may be configured to provide the updated attendance status information in a format that is recognizable by the particular schedule management application. Thus, the controller 340 may be configured to update the attendance status information 332 using different formats to provide interoperability between different and/or incompatible schedule management applications.

Moreover, the controller 340 may be configured to determine to cancel and/or reschedule the meeting based on the current locations of the wireless devices relative to the meeting location. For example, if the controller 340 determines that a particularly important attendee (such as a scheduled speaker) and/or a predetermined number of attendees will be unable to arrive at the meeting location in time for the scheduled meeting and/or within an acceptable degree of lateness based on the current locations of one or more of their wireless devices, the controller 340 may determine to cancel the meeting. As such, the controller 340 may be configured to transmit a cancellation notification to one or more electronic devices associated with the remaining attendees indicating that the meeting has been canceled via the transceiver 325.

In addition, in some embodiments, the controller 340 may be configured to receive additional scheduling data from one or more electronic devices associated with the desired attendees for the previously scheduled meeting via the transceiver 325. For example, the additional scheduling data may indicate other appointments and/or tasks currently scheduled for the attendees, as well as the associated times and/or locations. Accordingly, based on the additional scheduling data, the controller 340 may be configured to determine a future time and/or location to reschedule the meeting that may be likely to be acceptable to the attendees. The controller 340 may thus be configured to transmit a new meeting invitation suggesting and/or tentatively scheduling the possible meeting time and/or location to the electronic devices associated with the attendees, and may receive replies from one or more of the electronic devices indicating that the suggested time and/or location is acceptable. In addition, the controller 340 may be configured to automatically update the scheduling data 334 for the meeting in the memory 330 to reflect the new time and/or location. The controller 340 may also be configured to transmit a notification of the new time and/or location for the meeting to the electronic devices associated with the attendees via the transceiver 325 to automatically update the information stored in the electronic devices and/or synchronize information between the electronic devices and the schedule management server 300.

Although FIG. 3 illustrates an exemplary schedule management server 300 for managing appointments between a plurality of electronic devices according to some embodiments of the present invention, it will be understood that some embodiments of the present invention are not limited to such a configuration, but are intended to encompass any configuration capable of carrying out the operations described herein. For example, although the memory 330 is illustrated as a separate component from the controller 340, the memory 330 or portions thereof may be considered as part of the controller 340. In addition, although the scheduling data 334 and the attendance status information 332 are illustrated as stored in the memory 330, it is to be understood that the scheduling data 334 and/or the attendance status information 332 may be stored in another network device that may be accessible to the schedule management server 300, for example, via a wired and/or wireless network connection. In addition, some and/or all of the functionality described herein with reference to the schedule management server 300 may be implemented in a wireless device, such as the wireless device 200 of FIG. 2. More generally, while particular functionalities are shown in particular blocks by way of illustration, functionalities of different blocks and/or portions thereof may be combined, divided, and/or eliminated.

Figure 4:
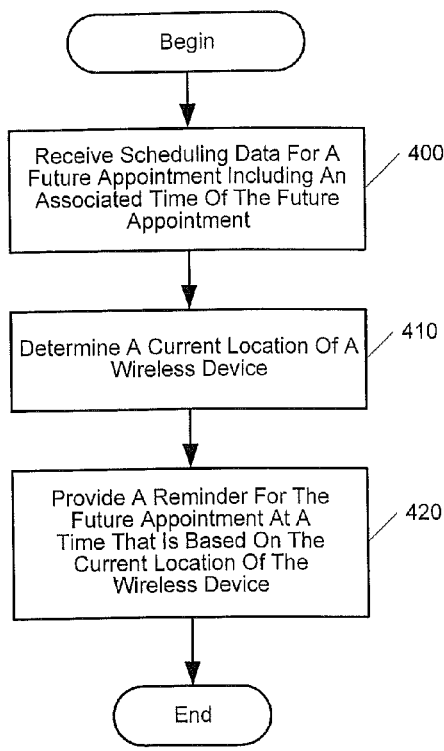
FIG. 4 is a flowchart illustrating operations for managing appointments using wireless devices according to some embodiments of the present invention.

FIG. 4 is a flowchart illustrating exemplary operations that may be performed by a wireless device, such as the wireless device 200 of FIG. 2, for managing appointments according to some embodiments of the present invention. Referring now to FIG. 4, operations begin when scheduling data for a future appointment is received at Block 400. For example, the scheduling data may be received from a user of the wireless device via a user interface of the wireless device. In addition, the scheduling data may be received from another electronic device, such as a personal computer and/or network server, via a wired and/or wireless connection. The scheduling data may include a time and/or a geographic location associated with the future appointment. The scheduling data may also include contact information for one or more persons associated with the appointment.

Still referring to FIG. 4, a current location of the wireless device is determined at Block 410. For example, the current location may be determined by the wireless device itself, using a built-in GPS chip and based on the GPS location techniques described above. In addition, information indicating the current location of the wireless device may be received from the network, for example, based on radiolocation and/or trilateration techniques. Other location techniques may also be used to determine the current location of the wireless device. The current location of the wireless device may be determined periodically, intermittently, and/or at predetermined times based on the time of the scheduled appointment.

At Block 420, a reminder for the future appointment is provided at a time prior to the future appointment based on the current location of the wireless device. For example, the reminder may be provided at a time that varies based on the current location of the wireless device relative to the location associated with the appointment, to allow the user of the wireless device sufficient time to travel from the current location to the appointment location in time for the appointment. As such, the time for the reminder may be determined based on an estimated travel time between the current location of the wireless device and the location associated with the future appointment. The estimated travel time may be calculated based on the distance between the current location and the appointment location, as well as real-time travel conditions such as weather, traffic, expected travel routes, and/or other conditions that may affect the travel time. In addition, the estimated travel time may be calculated based on historical data associated with the appointment location and/or nearby locations, for example, using geographic information system techniques. Also, the estimated travel time may be calculated based on a predicted and/or selected travel route between the current location of the wireless device and the appointment location. For example, a quickest and/or shortest travel route may be selected based on map data, real-time travel conditions, and/or historical data associated with the current location and/or the appointment location. The map data, real-time travel conditions, and/or historical data may be accessible via a network, such as the network 120 of FIG. 1. A map and/or directions to the appointment location may also be provided as part of the reminder, and may be displayed by the wireless device via the user interface. The time for the reminder may also be dynamically updated based on the changes in its current location of the wireless device. As such, a reminder for the future appointment may be provided at a time that will allow the user to arrive at the appointment location in time for the appointment.

Figure 5:
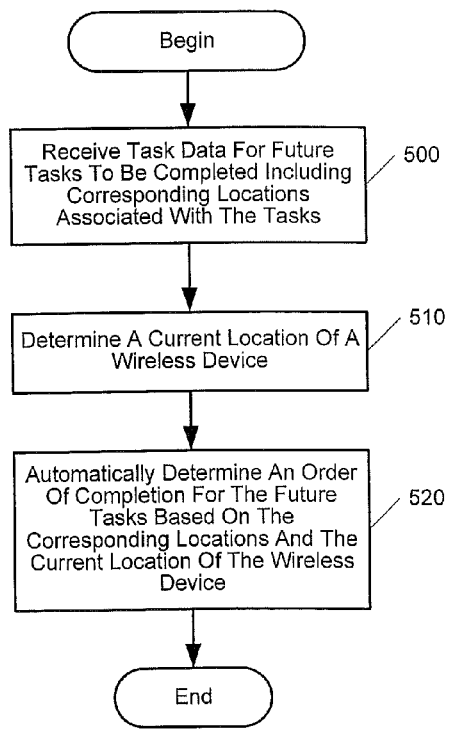
FIG. 5 is a flowchart illustrating operations for managing appointments using wireless devices according to further embodiments of the present invention.

FIG. 5 is a flowchart illustrating further exemplary operations that may be performed by wireless device, such as the wireless device 200 of FIG. 2, for managing tasks according to some embodiments of the present invention. Referring now to FIG. 5, operations begin when task data for future tasks to be completed is received at Block 500. The task data may include may include a geographic location associated with each task and/or a time before which each task must be completed. At Block 510, a current location of the wireless device is determined. The current location may be determined by the wireless device itself, for instance, based on the GPS location techniques using a built-in GPS chip, and/or may be determined based on information from the network, for example, using radiolocation and/or trilateration techniques. However, other location techniques as are well-known in the art may also be used to determine the current location of the wireless device.

Based on the task data and the current location of the wireless device, an order of completion for the future tasks is automatically determined (i.e., without human intervention) at Block 520. For example, the order of completion for the tasks may be automatically determined based on the geographic proximities between the corresponding locations for the tasks included in the task data and the current location of the wireless device. In addition, other factors, such as real-time travel conditions, historical data associated with each task location, and/or factors associated with the particular tasks themselves, such as food perishability, may be considered in determining the order of completion. Information relating to these additional factors may be accessible from other devices via a network, such as the network 120 of FIG. 1. As such, an order of completion may be determined that may improve manageability of the tasks for the user of the wireless device and/or may provide improved optimization in some other fashion.

Figure 6:
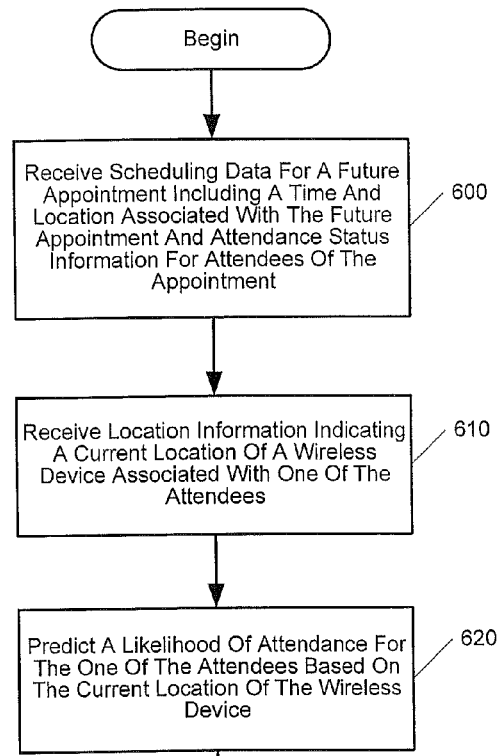
FIG. 6 is a flowchart illustrating operations for managing appointments using wireless devices according to still further embodiments of the present invention.

FIG. 6 is a flowchart illustrating exemplary operations that may be performed by server, such as the schedule management server 300 of FIG. 3, for managing appointments using wireless devices according to some embodiments of the present invention. Referring now to FIG. 6, operations begin when scheduling data for a future appointment and attendance status information for attendees of the future appointment is received at Block 500. For example, the scheduling data and/or attendance status information may be received from one or more electronic devices, such as the wireless devices 125a-125c and/or the personal computers 130a-130b of FIG. 1, via one or more wired and/or wireless connections. The scheduling data may include a time and location associated with the future appointment, as well as a list of desired attendees for the future appointment. The attendance status information may include indications for one or more of the desired attendees as to whether the attendees are currently scheduled to attend the future appointment.

At Block 610, location information indicating a current location of one or more wireless devices associated with one or more of the attendees is received. The location information may be received from one or more of the wireless devices themselves (for example, as determined from GPS chips built-in to the wireless devices) and/or from the network (for example, as determined using radiolocation and/or trilateration techniques). The location information may be received from the wireless devices and/or the network periodically, intermittently, and/or at times based on the time of the scheduled appointment.

Based on the current location of one or more of the wireless devices, a likelihood of attendance for a corresponding attendee is predicted at Block 620. In other words, a future availability of one or more of the attendees to attend the scheduled meeting is determined based on the current locations of their corresponding wireless devices. For example, based on the time and location of the appointment, an estimated time of arrival and/or may estimated travel time be calculated for one or more of the wireless devices based on their current locations. If the estimated time of arrival for one or more of the wireless devices is after the time of the future appointment, the attendees associated with those wireless devices may be determined to be unlikely to attend and/or unable to attend promptly. The likelihood of attendance for one or more of the attendees may be predicted based on historical data associated with the appointment location and/or based on real-time travel conditions and/or historical routes taken and/or expected routes between the current locations of the wireless devices and the appointment location, for example, by accessing map, weather, traffic, and/or GIS data via a network, such as the network 120 of FIG. 1.

As such, the attendance status information for one or more of the attendees of the future appointment is updated based on the predicted likelihood of attendance at Block 630. For example, when a particular attendee is determined to be unlikely to attend based on the current location of his wireless device, a message may be transmitted to the wireless devices associated with the other attendees indicating that the particular attendee will be unable to attend the appointment at the scheduled time. The message may further indicate the current location of the wireless device associated with the particular attendee, an estimated delay time, and/or an estimated time of arrival at the appointment location. The attendance status information may also be updated between different schedule management applications, such as Microsoft Outlook and Apple's iCal. More particularly, the updated attendance status information may be provided in a format that is recognizable by the particular schedule management application to provide interoperability between different and/or incompatible schedule management applications. Moreover, if it is determined that a particularly important attendee (such as a scheduled speaker) and/or a predetermined number of attendees will be unable to arrive at the appointment location in time and/or within an acceptable degree of lateness based on the current locations of one or more of the wireless devices, a determination to cancel and/or reschedule the future appointment may be made.

The flowcharts of FIGS. 4 to 6 illustrate the architecture, functionality, and operations for location-based schedule management and related devices according to some embodiments of the present invention. In this regard, each Block may represent a module, segment, or a portion of code, which may comprise one or more executable instruction for implementing the specified logical functions. It should also be noted that in other implementations, the functions noted in the Blocks may occur out of the order noted in FIGS. 4 to 6. For example, two Blocks shown in succession may, in fact, be executed substantially concurrently, or the Blocks may be sometimes executed in the reverse order, depending on the functionality involved.

In the drawings and specification, there have been disclosed exemplary embodiments of the invention, and although specific terms are used, they are used in a generic and descriptive sense only and not for purposes of limitation, the scope of the invention being defined by the following claims.

That which is claimed:

1. A device-implemented method, for managing a future appointment, comprising:
   receiving, by a wireless device, scheduling data for the future appointment, the scheduling data including a time and a location associated with the future appointment and contact information for at least one person associated with the future appointment;
   determining, by the wireless device, a current location of the wireless device;
   providing, by the wireless device, a reminder for the future appointment at a time sufficiently prior to the time of the future appointment to allow for attendance of the future appointment based on the current location, wherein the time at which the reminder is provided dynamically varies based on the current location of the wireless device relative to the location associated with the future appointment;
   determining that a user of the wireless device will be late for the future appointment based on the current location of the wireless device, the location of the future appointment, and the time associated with the future appointment; and
   automatically initiating using the contact information and responsive to determining that the user will be late, display at the wireless device, for viewing by the user, of a prompt for the user to initiate a communication between the wireless device and at least one electronic device associated with the at least one person.

2. The device-implemented method of claim 1, further comprising:
   obtaining current weather data; and
   determining real-time travel conditions based at least in part on said weather data;
   wherein providing the reminder, by the wireless device, comprises:
      determining, by the wireless device, an initial time for the reminder,
      calculating, by the wireless device, based on said real-time travel conditions, an estimated travel time between the current location of the device and the location associated with the future appointment;
      altering, by the wireless device, the initial time for the reminder based on the estimated travel time and the time associated with the future appointment, yielding an altered time for the reminder; and
      providing, by the wireless device, the reminder at the altered time in accordance with the estimated travel time.

3. The device-implemented method of claim 2, wherein determining the real-time travel conditions is based also on non-weather travel-related variables at or between the current location of the device and the location of the future appointment.

4. The device-implemented method of claim 1, further comprising:
   selecting, by the wireless device, a travel route to the location associated with the future appointment based on the current location of the wireless device; and
   providing, by the wireless device, automatically, without user input initiating the providing, directions to the location associated with the future appointment based on the travel route that was selected.

5. The device-implemented method of claim 4, wherein providing, by the wireless device, directions to the location associated with the future appointment includes providing the directions as part of the reminder.

6. The device-implemented method of claim 1, further comprising:
   receiving, by the wireless device, task data for a plurality of future tasks to be completed, each task being distinct from the future appointment, and the task data including a respective location associated with each of the plurality of tasks; and
   automatically determining an order of completion for the plurality of future tasks based on the respective locations and the current location of the wireless device.

7. The device-implemented method of claim 1, wherein initiating display of the prompt includes initiating display of the prompt which indicates:
   the current location of the wireless device; and
   at least one time selected from a group consisting of (i) an estimated amount of time that the user is expected to be late and (ii) an estimated time of arrival of the user at the location associated with the future appointment.

8. The device-implemented method of claim 1, wherein initiating display of the prompt includes initiating display of the prompt being configured to be specific to the user of the wireless device.

9. The device-implemented method of claim 1, wherein the prompt to initiate the communication prompts the user expressly to initiate communication via at least one pre-determined type of communication selected from a group consisting of: phone call; e-mail; short messaging system message; and instant message.

10. A computer-implemented method, for managing a future appointment, comprising:
   receiving, by a non-transitory schedule management server, scheduling data for the future appointment including a time and location associated with the future appointment and current attendance status information for a plurality of attendees who are scheduled to attend the future appointment, wherein the current status information, for one of the plurality of attendees, indicates that the one of the plurality of attendees will attend the future appointment;
   receiving, by the non-transitory schedule management server, location information indicating a current location of a wireless device associated with the one of the plurality of attendees in real-time;
   predicting, by the non-transitory schedule management server, a likelihood of attendance of the future appointment for the one of the plurality of attendees based on the current location of the wireless device and at least one of the time and location associated with the future appointment;
   determining, by the non-transitory schedule management server, based on the predicted likelihood of attendance, that a change in the current attendance status information for the one of the plurality of attendees, to indicate that the one of the plurality of attendees will not attend, is required;

updating, by the non-transitory schedule management server in real-time, the current attendance status information for the one of the plurality of attendees of the future appointment, based on the determined change to provide updated attendance status information, to indicate that the one of the plurality of attendees will not attend;

maintaining the future appointment as scheduled for taking place, at said time, despite the current attendance status of the one of the plurality of attendees being changed to indicate that the one of the plurality of attendees will not attend;

determining that an attendance condition has been met, wherein the attendance condition comprises the current attendance status of each of a pre-determined sub-set of the plurality of attendees, the sub-set not including solely said one of the plurality of attendees, having changed from indicating that each of the sub-set will attend to indicating that each of the sub-set will not attend; and determining, by the non-transitory schedule management server, to cancel the future appointment in response to determining that the attendance condition has been met.

11. The computer-implemented method of claim 10, wherein updating the attendance status information, by the non-transitory schedule management server, further comprises automatically transmitting, from the non-transitory schedule management server, a message to an electronic device associated with another one of the plurality of attendees indicating (i) the updated attendance status information for the one of the plurality of attendees, indicating that the one of the plurality of attendees will not attend, and (ii) that the future appointment is still scheduled for taking place at said time.

12. The computer-implemented method of claim 10, further comprising:

accessing, by the non-transitory schedule management server, additional scheduling data for at least one of the plurality of attendees; and automatically determining, by the non-transitory schedule management server, a future time to reschedule the future appointment based on the additional scheduling data for the at least one of the plurality of attendees.

13. The computer-implemented method of claim 10, wherein:

receiving, by the non-transitory schedule management server, location information further comprises receiving location information from ones of a plurality of wireless devices associated with ones of the plurality of attendees, the location information indicating current locations of the ones of the plurality of wireless devices;

predicting, by the non-transitory schedule management server, the likelihood of attendance comprises predicting a plurality of likelihoods of attendance for the ones of the plurality of attendees based on the current locations of the ones of the plurality of wireless devices; and updating, by the non-transitory schedule management server, the attendance status information comprises updating the attendance status information for the ones of the plurality of attendees based on the plurality of predicted likelihoods of attendance and automatically transmitting a message to the ones of the plurality of wireless devices indicating the updated attendance status information for the ones of the plurality of attendees.

14. A device-implemented method, for managing an appointment, comprising:

receiving, by a wireless device, scheduling data for a future appointment, the scheduling data including a time and a location associated with the future appointment and contact information for at least one person associated with the future appointment;

determining, by the wireless device, a current location of the wireless device;

providing, by the wireless device, a reminder for the future appointment at a time sufficiently prior to the time of the future appointment to allow for attendance of the future appointment based on the current location, wherein the time at which the reminder is provided dynamically varies based on the current location of the wireless device relative to the location associated with the future appointment;

determining that a user of the wireless device will be late for the future appointment based on the current location of the wireless device, the location of the future appointment, and the time associated with the future appointment; and initiating, by the wireless device, using the contact information and responsive to determining that the user will be late, display at the wireless device, for viewing by the user, of a prompt for the user to initiate a communication between the wireless device and at least one electronic device associated with the at least one person.

15. The device-implemented method of claim 14, further comprising:

obtaining current weather data; and determining real-time travel conditions based at least in part on said weather data;

wherein providing the reminder, by the wireless device, comprises:

determining, by the wireless device, an initial time for the reminder, calculating, by the wireless device, based on said real-time travel conditions, an estimated travel time between the current location of the device and the location associated with the future appointment;

altering, by the wireless device, the initial time for the reminder based on the estimated travel time and the time associated with the future appointment, yielding an altered time for the reminder; and providing, by the wireless device, the reminder at the altered time in accordance with the estimated travel time.

16. The device-implemented method of claim 15, wherein determining the real-time travel conditions is based also on non-weather travel-related variables at or between the current location of the device and the location of the future appointment.

17. The device-implemented method of claim 14, further comprising:

selecting, by the wireless device, a travel route to the location associated with the future appointment based on the current location of the wireless device; and providing, by the wireless device, automatically, without user input initiating the providing, directions to the location associated with the future appointment based on the travel route that was selected.

18. The device-implemented method of claim 14, further comprising:

receiving, by the wireless device, task data for a plurality of future tasks to be completed, each task being distinct from the future appointment, and the task data including a respective location associated with each of the plurality of tasks; and automatically determining an order of completion for the plurality of future tasks based on the respective locations and the current location of the wireless device.

19. The device-implemented method of claim 14, wherein initiating display of the prompt includes initiating display of the prompt which indicates:

the current location of the wireless device; and at least one time selected from a group consisting of (i) an estimated amount of time that the user is expected to be late and (ii) an estimated time of arrival of the user at the location associated with the future appointment.

20. The device-implemented method of claim 14, wherein initiating display of the prompt includes initiating display of the prompt being configured to be specific to the user of the wireless device.

21. The device-implemented method of claim 14, wherein the prompt to initiate the communication prompts the user expressly to initiate communication via at least one pre-determined type of communication selected from a group consisting of: phone call; e-mail; short messaging system message; and instant message.

* * * * *